Figure 1A:
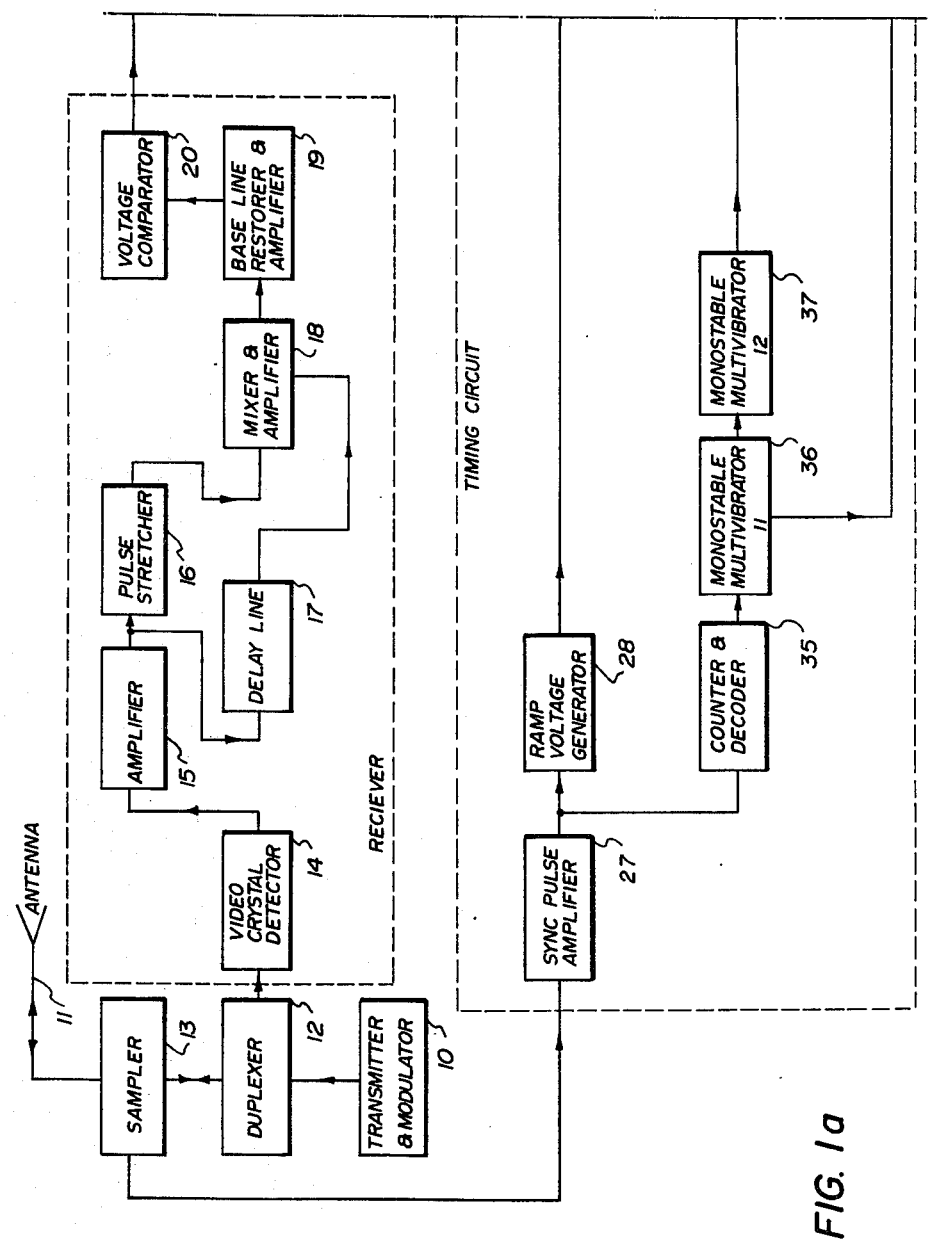

United States Patent [19]

Westby

[11] 4,174,520
[45] Nov. 13, 1979

[54] RADAR ALTIMETER FOR TROPICAL AREAS

[75] Inventor: Ray L. Westby, Ottawa, Canada

[73] Assignee: Canadian Patents & Development Limited, Ottawa, Canada

[21] Appl. No.: 877,308

[22] Filed: Feb. 13, 1978

[51] Int. Cl.$^2$ .............................................. G01S 9/12
[52] U.S. Cl. ................................................. 343/13 R
[58] Field of Search ...................................... 343/13 R

[56] References Cited

U.S. PATENT DOCUMENTS

| | | | |
|---|---|---|---|
| 3,248,729 | 4/1966 | Howard et al. | 343/13 R X |
| 3,267,416 | 8/1966 | Morse | 343/13 R X |
| 3,366,956 | 1/1968 | Westby | 343/13 R |
| 3,373,399 | 3/1968 | Dorr et al. | 343/13 R X |
| 3,500,395 | 3/1970 | Foster et al. | 343/5 R |
| 3,573,825 | 4/1971 | Westby | 343/13 R |
| 3,611,373 | 10/1971 | Cartwright | 343/13 R X |
| 3,614,778 | 10/1971 | Graham et al. | 343/5 CM X |
| 3,624,651 | 11/1971 | Robert et al. | 343/13 R X |
| 3,752,581 | 8/1973 | Everest et al. | 343/13 R X |
| 4,001,823 | 1/1977 | Matsui et al. | 343/13 R X |

Primary Examiner—Malcolm F. Hubler
Attorney, Agent, or Firm—J. R. Hughes

[57] ABSTRACT

A radar altimeter system for measuring, from an aircraft flying above tropical forest areas, the height of the ground and the height of the forest canopy above the ground comprising a transmitter, a receiver for detecting return pulses from the ground and forest canopy, timing means for measuring the time of arrival at the beginning and end of each received pulse and averaging the said times, means for examining the received pulse duration and preventing pulses with a shorter time duration than a predetermined time from passing further in the system, and means for examining a selected number of pulses and coupling the voltage derived from the received pulse having the longest time of arrival to an output to give an indication of the ground level and the voltage derived from the received pulse having the shortest time of arrival to an output to give an indication of the forest canopy level.

1 Claim, 4 Drawing Figures

RADAR ALTIMETER FOR TROPICAL AREAS

This invention relates to radar altimeters especially those useful in the assessment of forest inventories and to a timing circuit therefore.

The present inventor's U.S. Pat. No. 3,366,956 issued Jan. 30, 1968 describes a radar system for use as an altimeter of high accuracy which is especially useful in the making of large scale topographic and contour maps and especially those directed towards the assessment of forest inventories. The system described in this patent was designed to avoid obtaining readings from the tree tops rather than the ground proper and involved the use of two circuits that are each directed to detecting the time of occurrence, as nearly as possible, of the peak of a return pulse rather than of the foot of the leading edge of this pulse.

The present inventor's U.S. Pat. No. 3,573,825 issued Apr. 6, 1971 describes a high accuracy radar altimeter which measures the average height above sloping ground by use of a circuit sensitive to the timing of the mean peak of each return pulse which eliminating the effect of signals reflected from vegetation. In the system described verification of the receipt of a return pulse is achieved by use of Miller circuits which are triggered on by a return pulse and off by a delayed sample of the corresponding transmitted pulse.

The systems described in the two above mentioned patents operate quite successfully especially in northern forest areas, however in typical rain forest areas, the tree canopy provides the major proportion of the reflected pulses rather than the jungle floor. It has been found that in using radar altimeters of this type in tropical areas it would be useful and desirable to obtain simultaneously a ground and treetop profile in tropical rain forests.

It is an object of the present invention to provide a forestry radar altimeter that is able to obtain a ground and treetop profile at the same time when overflown by an aircraft containing the altimeter system.

This and other objects of the invention are achieved by a radar altimeter system for measuring, from an aircraft flying above tropical forest areas, the height of the ground and the height of the forest canopy above the ground comprising a transmitter, a receiver for detecting return pulses from the ground and forest canopy, timing means for measuring the time of arrival at the beginning and end of each received pulse and averaging the said times, means for examining the received pulse duration and preventing pulses with a shorter time duration than a predetermined time from passing further in the system, and means for examining a selected number of pulses and coupling the voltage derived from the received pulse having the longest time of arrival to an output to given an indication of the ground level and the voltage derived from the received pulse having the shortest time of arrival to an output to given an indication of the forest canopy level.

Figure 1B:
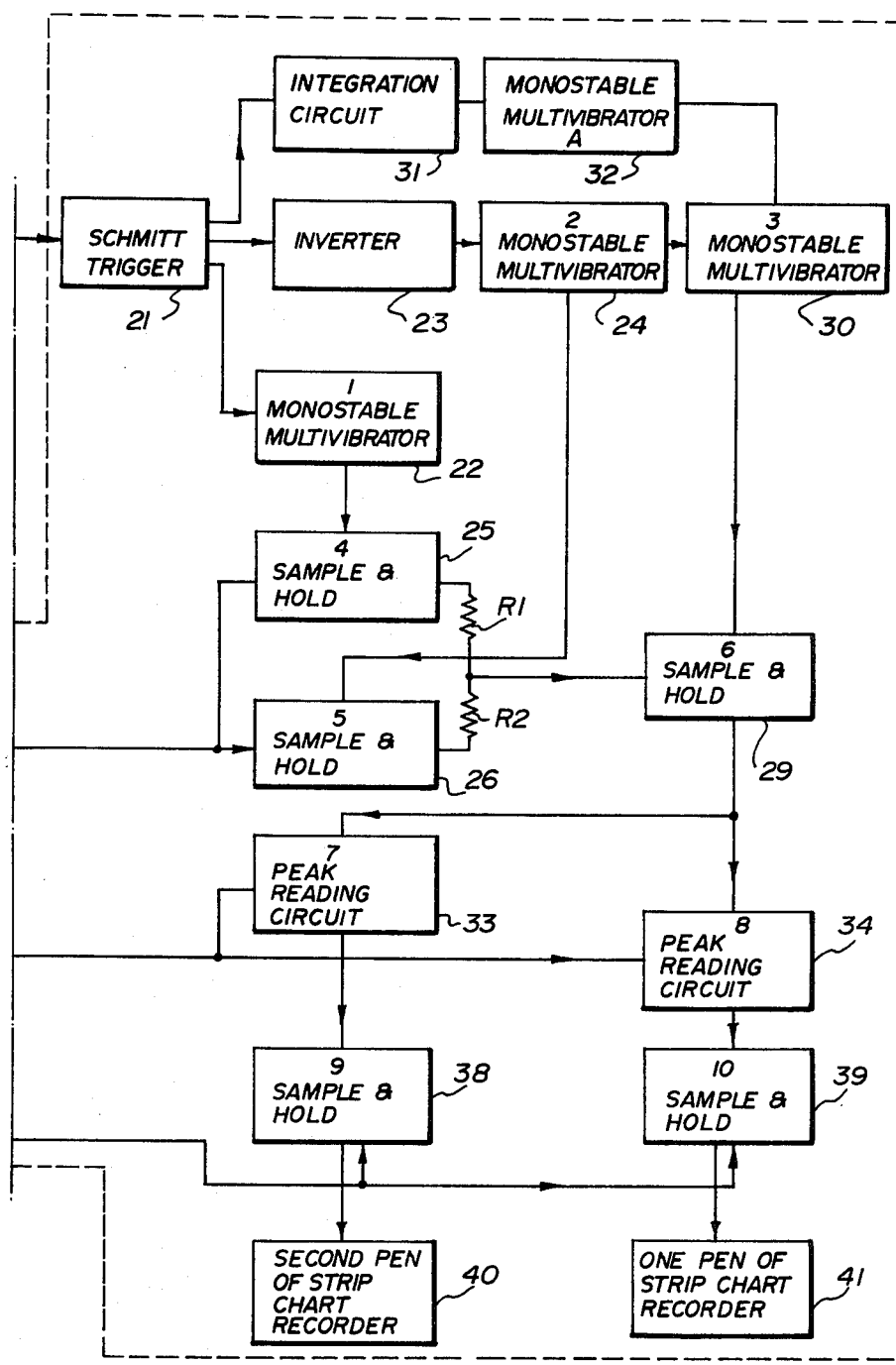
Figure 2:
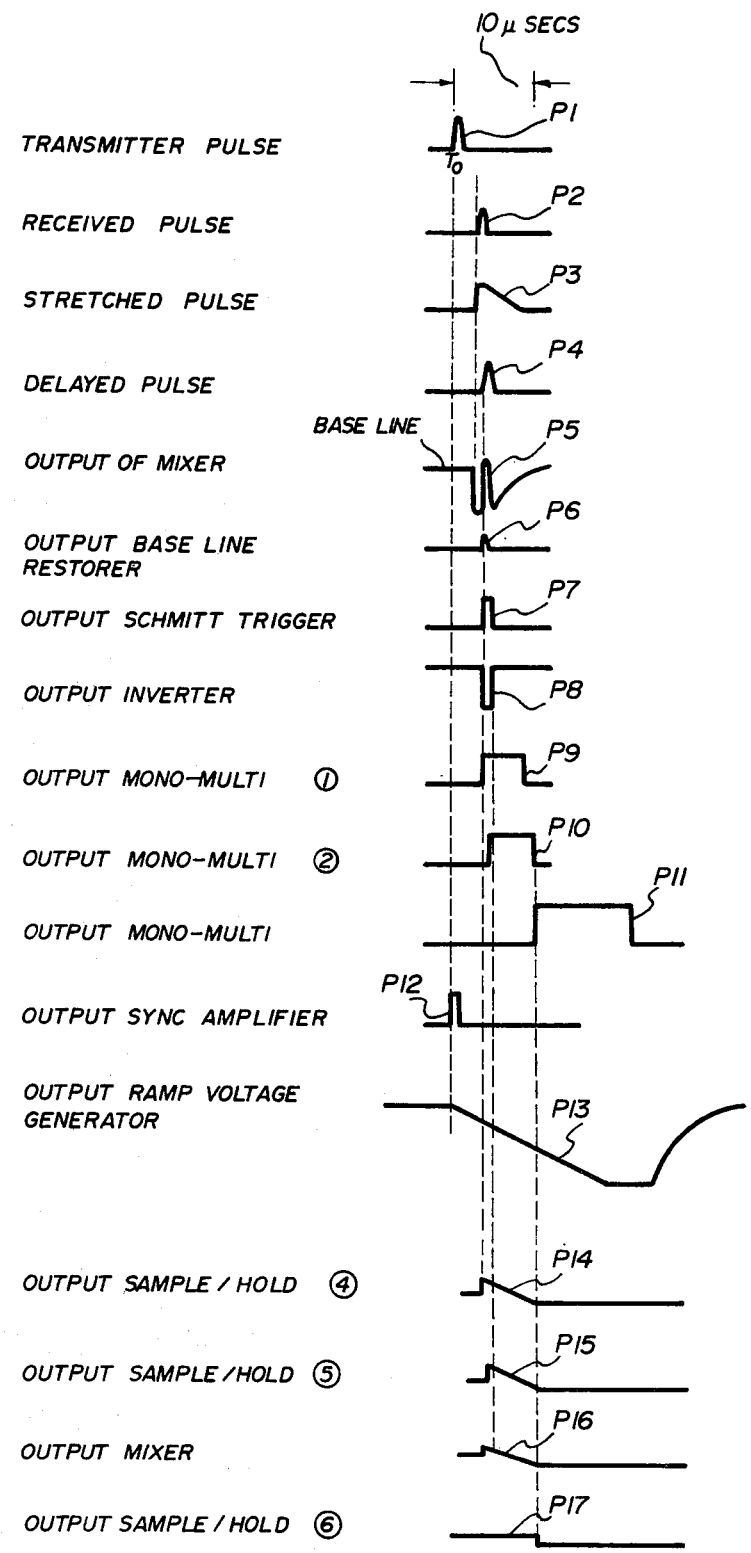
Figure 3:
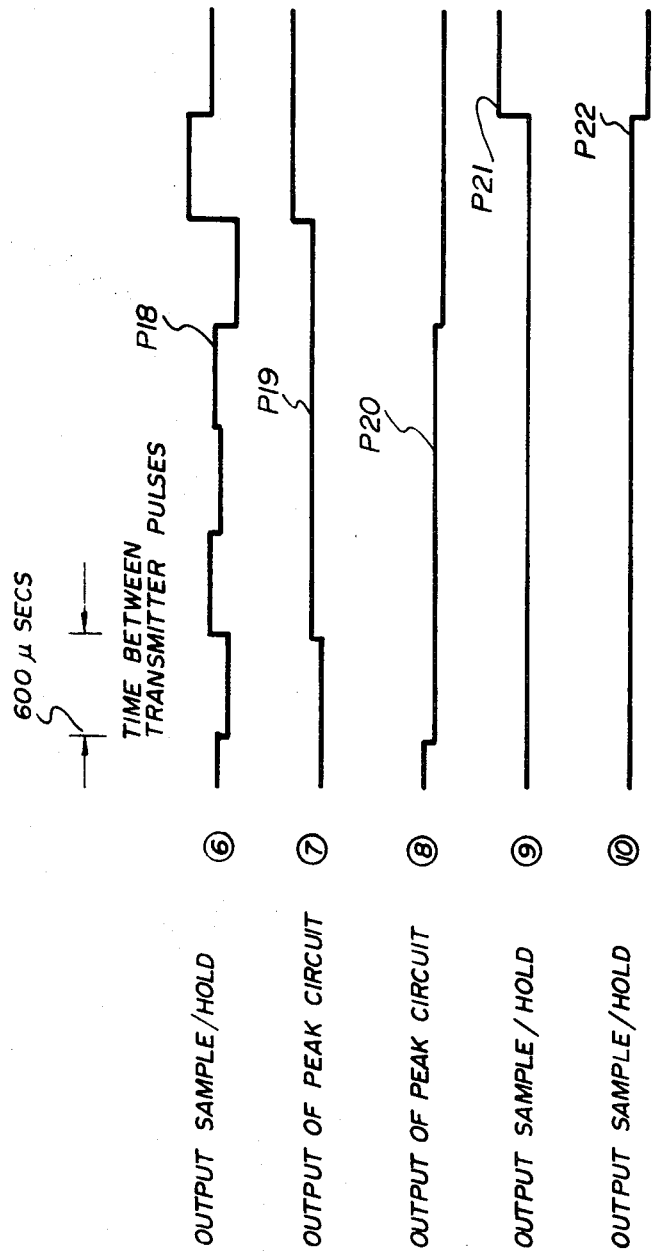

In drawings which illustrate an embodiment of the invention,

FIG. 1 (1a and 1b) is a block diagram of the tropical radar altimeter system, and FIGS. 2 and 3 are pulse diagrams.

Referring to FIG. 1 in conjunction with FIG. 2, the overall radar system is shown and is essentially the same as that shown in U.S. Pat. No. 3,573,825 already referred to and a paper entitled "A Narrow Beam Radar Altimeter for Remote Sensing" published by the present inventor in the Canadian Journal of Remote Sensing, Vol. 1, No. 1, May 1975, except for the timing circuit. Transmitter and modulator 10 connect the antenna 11 through duplexer 12 and sampler 13 which takes a sample of the transmitted pulse (P1) for use as a sync pulse for the timing circuit. The received pulse (P2) is applied to the receiver which contains a video crystal detector 14 and an amplifier 15 after which the signal is divided into two paths. A stretched pulse (P3) is obtained from pulse stretcher 16 and a delayed pulse (P4) is obtained from delay line 17. These two are mixed in mixer and amplifier 18 which for example could be a field effect transistor to give an output pulse (P5). A base line restorer and amplifier circuit 19, removes the part of the P signal that appears below the base line and amplifies the part above, which is the peak of the received pulse. This is passed through a voltage comparator 20 that squares the peak of the received pulse and then to the Schmitt trigger 21 in the timing circuit. The timing circuit can be divided into three sections. The first section measures the time of arrival at the beginning and end of each received pulse and averages. The second section examines the pulse duration and prevents the averaged reading, from a pulse that has a shorter duration than a pre-determined time, from being coupled to the third section. The third section examines a selected number of pulses and couples the voltage derived from the received pulse having the longest time of arrival (the ground) to one pen or a two pen strip-chart recorder and the voltage from the pulse having the shortest time of arrival to the other pen of the strip-chart recorder (the trees).

Referring specifically to the drawings again Schmitt trigger 21 duplicates the comparator output and provides sufficient drive for the following circuits. Its output is shown as "output Schmitt Trigger" (P7 on FIG. 21). Monostable multivibrator 22 is triggered by the positive leading edge of the Schmitt trigger pulse. The Schmitt trigger pulse is inverted by inverter 23 (P8) and the positive trailing edge of this pulse triggers monostable multivibrator 24. The pulse from monostable multivibrator 22 (P9) and multivibrator 24 (P10) have a preset time (e.g. 6 microseconds) of duration and pulse P 10 ends after pulse P9 as shown in FIG. 2. These pulses trigger sample and hold circuits 25 and 26 to the sample mode for 6 microseconds.

A sample of the transmitted pulse is used to create a sync pulse. After being multiplied in sync pulse amplifier 27, this pulse (P12) triggers ramp voltage generator 28 whose output (P13) is a voltage that changes linearly with time starting at the time of the transmitted pulse. The output of this circuit is coupled to sample and hold circuits 25 and 26. As described above these sample and hold circuits are switched to the sample mode for 6 microseconds by the monostable multivibrators which allows the sample and hold circuits sufficient time to accurately measure the voltage from the ramp generator. After 6 microseconds the sample and hold circuits 25 and 26 revert to the hold mode. The output voltages P 14 and P 15 of these circuits are averaged by the resistor network R1 and R2 and the output from the network which is related to distance because the ramp voltage is started at the time of a transmitted pulse and sampled for a fixed time after the received pulse (6 microseconds) is coupled to sample and hold circuit 29 which is switched to the sample mode by monostable multivibrator 30. The pulse from Schmitt trigger 21 is integrated in integrator circuit 31 and fed to monostable multivibrator 32. If the pulse from the Schmitt trigger has a long enough duration, the voltage from the integration circuit will have a sufficient amplitude to trigger monostable multivibrator 32 which will enable monostable multivibrator 30 to be triggered by the trailing edge of the pulse from monostable multivibrator 24 giving an output (P11) applied to sample and hold circuit 29 to hold it in the sample mode for a period (e.g. 20 microseconds) just after sample and hold circuits 25 and 26 are reverted to the hold mode. The output of sample and hold circuit 29 (P17) is the same as the averaged voltage (P16) from the resistor network R1, R2, but only when the received pulse satisfies the duration criteria set by the adjustment of the integration circuit.

Sample and hold circuit 29 is followed by and connected to peak reading circuits 33 and 34. Referring also to the pulse diagrams of FIG. 3, the output of the sample and hold circuit 29 is shown as waveform P18. One of the peak reading circuits is used to read the highest voltage received from sample and hold circuit 29 and the second to measure the lowest voltage. The output from the sync pulse amplifier 27 is also connected to counter and decoder 35 which is set up to count a preset number of transmitted pulses (e.g. between 10 and 9000). In actual trials in tropical rain forest areas, one hundred pulses was found to be optimum. Monostable multivibrator 36 is triggered once every pre-set number (e.g. 100) of transmitted pulses providing a 20 microsecond pulse which is applied to monostable multivibrator 37 which is triggered by the end of the 20 microsecond pulse to create a 20 microsecond pulse. Peak reading circuits 33 and 34 are in the peak reading mode for a period of time equivalent to the pre-set number (100) of transmitted pulses and are then reset by the pulse from multivibrator 37. The outputs of the peak reading circuits (e.g. P19 and P20) are coupled to sample and hold circuits 38 and 39. A pulse from multivibrator 36 switches these circuits to the sample mode for 20 microseconds sampling the voltages of the peak reading circuit after which the peak circuits are reset by the pulse from multivibrator 37. The outputs of sample and hold circuits 38 and 39 (P21 and P22), one of which will be the shortest time (tree tops) and the other the longest time (the ground) are coupled to suitable read-out devices such as strip chart recorders 40 and 41.

I claim:

1. A radar altimeter system for measuring from an aircraft flying above tropical forest areas, the height of the ground and the height of the forest canopy above the ground comprising:
    (a) a transmitter and antenna system for beaming a series of transmitted pulses towards the ground from an aircraft,
    (b) a receiver for detecting return pulses from the ground and the forest canopy,
    (c) timing means for measuring, in relation to the transmitted pulse, the time of arrival at the beginning and end of each received pulse and averaging these times,
    (d) means for examining the received pulse duration and preventing pulses having a shorter time duration than a predetermined time from passing further in the system, and
    (e) means for examining a selected number of pulses and coupling the voltage derived from the received pulse having the longest time of arrival to an output to give an indication of the ground level and the voltage derived from the received pulse having the shortest time of arrival to an output to give an indication of the forest canopy level.

* * * * *